United States Patent [19]

Clark et al.

[11] 3,904,544

[45] Sept. 9, 1975

[54] TREATMENT OF OPTICAL BRIGHTENING AGENTS

[75] Inventors: David Ronald Clark; Thomas Gerald Hyde, both of Broolands, Sale, England

[73] Assignee: Ciba-Geigy AG, Basel, Switzerland

[22] Filed: Sept. 27, 1972

[21] Appl. No.: 292,705

[30] Foreign Application Priority Data

| Oct. 2, 1971 | United Kingdom............... 45933/71 |
| Oct. 2, 1971 | United Kingdom............... 45934/71 |
| Oct. 2, 1971 | United Kingdom............... 45935/71 |
| Oct. 2, 1971 | United Kingdom............... 45936/71 |

[52] U.S. Cl.................. 252/301.2 W; 252/301.3 W; 252/317; 252/363.5; 252/543
[51] Int. Cl.............................................. C09k 1/02
[58] Field of Search.... 252/301.2 W, 301.3 W, 543, 252/363.5, 317; 8/1 W, 77, 82, 83

[56] References Cited

UNITED STATES PATENTS

| 3,012,971 | 12/1961 | Gessner et al. ............. 252/301.2 W |
| 3,360,479 | 12/1967 | Hausermann ............... 252/301.2 W |
| 3,595,801 | 7/1971 | Rosch et al. ................. 252/301.2 W |
| 3,669,896 | 6/1972 | Preininger................... 252/301.2 W |
| 3,689,429 | 9/1972 | Deubel et al................ 252/301.2 W |
| 3,728,275 | 4/1973 | Horlacher et al. ............ 117/33.5 T |

FOREIGN PATENTS OR APPLICATIONS

| 571,778 | 3/1959 | Canada ........................... 252/890 B |
| 1,242,689 | 8/1971 | United Kingdom................. 252/543 |

*Primary Examiner*—Daniel E. Wyman
*Assistant Examiner*—A. P. Demers
*Attorney, Agent, or Firm*—Joseph G. Kolodny; Prabodh I. Almaula; Edward McC. Roberts

[57] ABSTRACT

The present invention provides a process in which a slurry is prepared containing optical brighteners from the distilbene, pyrazoline, coumarine and triazolyl-stilbene series, by mixing the wet filter-cake obtained during the preparation of these compounds with such quantity dispersing agent and/or electrolyte that the resultant slurry is thixotropic and, therefore, has reduced tendency to settle out on static storage and has a Brookfield viscosity at equilibrium from 2,000 to 10,000 centipoise at 6 revolutions per minute, 1,000 to 3,500 centipoise at 12 revolutions per minute and up to 2,000 centipoise at 60 revolutions per minute.

56 Claims, No Drawings

TREATMENT OF OPTICAL BRIGHTENING AGENTS

The present invention relates to a method of preparing slurries of optical brightening agents.

Optical brightener agents are often used in the form of a dry powder which is prepared from the wet filter-cake which, after being transferred to trays, is dried in ovens for several hours. Due to difficulties in handling the dry powder and because of the dust hazard it would be advantageous to use the brightening agent in the form of an aqueous slurry. Indeed, attempts have been made to slurry the dry powder and also the wet filter-cake by mixing with water, but these have not been successful in that the slurry obtained is not homogeneous, tends to settle quite quickly and the product brightening and the cold water dyeing properties can be affected. There are also difficulties involved in slurrying a dry powder.

We have found, surprisingly, that homogeneous, thixotropic slurries of such brightening agents can be prepared by mixing their wet filter-cakes with an electrolyte. Such slurries do not settle appreciably during static storage, since they set to a gel-like form and no appreciable settling takes place during static storage for long periods, for instance 12 weeks. In addition to the good settling properties the slurries have viscosity characteristics which make them much easier to handle than the powdered form since they can be discharged from storage under gravity or by pumping, and the dust hazard which is presented by the powdered form is eliminated. Moreover there is no deterioration in their product brightening or cold water dyeing properties when incorporated in a spray-dried detergent.

A thixotropic slurry in the context of this invention is a slurry for which:

1. The viscosity at constant shear rate as measured on a Brookfield Viscometer falls with time until equilibrium is reached. This equilibrium is usually reached after about 1 minute and after this time the viscosity remains constant.

2. The viscosity falls with increase in shear rate.

The present invention is directed to the production of thixotropic slurries of a compound having the formula:

$$R_1 - CH = CH - X - CH = CH - R_2 \quad \text{I}$$

in which X represents a diphenyl residue linked in position 4 and 4'- with the =CH— groups; $R_1$ and $R_2$, independently of each other, each represents a benzene residue, a diphenyl residue, a naphthyl residue or a pyridyl residue, at least one of the cyclic systems $R_1$, $R_2$, X containing a possibly functionally modified sulphonic acid group, a sulphone group, possibly functionally modified carboxylic acid group, a nitrile, hydroxyl, halogen, mercapto or methyl group, or of a compound having the formula

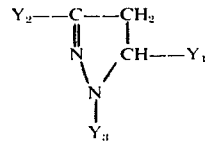

wherein $Y_1$ is a hydrogen atom or a substituted or unsubstituted hydrocarbon radical, $Y_2$ a substituted or unsubstituted phenyl radical and $Y_3$ is a phenyl radical substituted in the para position by an alkyl carboxylate group containing from 1–4 carbon atoms in the alkyl radical, or a cyano group, or a carbonamide group optionally substituted by low alkyl groups or an optionally substituted sulphonamide group or an alkylsulphonyl group or substituted in the meta position by fluorine, chlorine or bromine, or of a compound having the formula

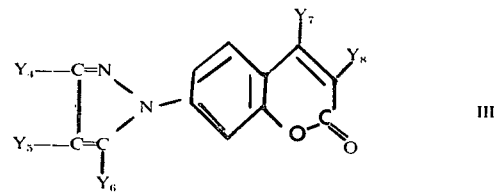

wherein $Y_4$ is hydrogen, an alkyl radical having 1–5 carbon atoms, an optionally substituted phenyl radical, $Y_5$ is hydrogen, chlorine, an optionally substituted phenyl radical, $Y_6$ is hydrogen or a low alkyl radical, $Y_4$ and $Y_5$ together with the carbon atoms to which they are attached may form a hydroaromatic ring, $Y_7$ is hydrogen and $Y_8$ is a phenyl group optionally substituted by a methyl group or a chlorine atom, or is a sulphonic acid group, a sulphonamide group or a substituted sulphonamide group.

According to the present invention there is provided a process in which a slurry is prepared containing from 15% to 60% by weight of a compound having the formula I, II or III by mixing the wet filter-cake obtained during the preparation of this compound with such quantity of dispersing agent that the resultant slurry is thixotropic and, therefore, has reduced tendency to settle out on static storage and has a Brookfield viscosity at equilibrium from 2,000 to 10,000 centipoise at 6 revolutions per minute, 1,000 to 3,500 centipoise at 12 revolutions per minute and up to 2,000 centipoise at 60 revolutions per minute.

The wet filter-cake may contain from 20% to 80% solids depending on the filtration conditions, but usually it contains from 35% to 55% solids.

We have found that compounds of formula I which are of particular value in the preparation of homogeneous thixotropic slurries are those in which both $R_1$ and $R_2$ represent a benzene residue, for instance, compounds of the general formulae

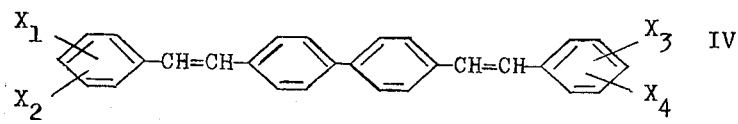

wherein $X_1$ is a sulphonic acid radical or its alkali metal salt, $X_2$ is hydrogen, a sulphonic acid radical or its alkali metal salt, halogen, alkyl with 1 to 4 carbon atoms or a carboxylic acid group or its alkali metal salt, $X_3$ is hydrogen, a sulphonic acid radical or its alkali metal salt, halogen, alkyl with 1 to 4 carbon atoms, alkoxy with 1 to 4 carbon atoms, a carboxylic acid group or its alkali metal salt, carbalkoxy with 2 to 5 carbon atoms or cyano and $X_4$ is hydrogen, a sulphonic acid radical or its alkali metal salt, halogen, alkyl with 1 to 4 carbon atoms or alkoxy with 1 to 4 carbon atoms, the grouping $X_2$ being preferably hydrogen or chlorine, $X_3$ being preferably the sulphonic acid radical or its sodium salt or chlorine and $X_4$ being preferably hydrogen or chlorine, and

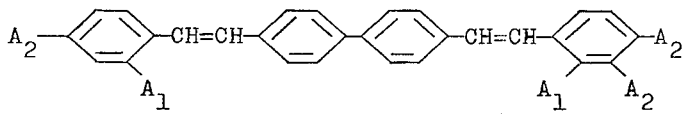  V wherein $A_1$ is an alkali metal sulphonic acid radical, a halogen atom or hydrogen and $A_2$ is a halogen or hydrogen atom. The grouping $A_1$ is preferably a sodium sulphonic acid radical or chlorine atom and the grouping $A_2$ is preferably a hydrogen atom.

Examples of compounds of formulae II and III are those having the formulae:

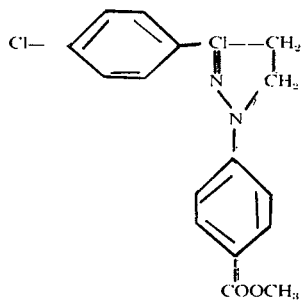  VI

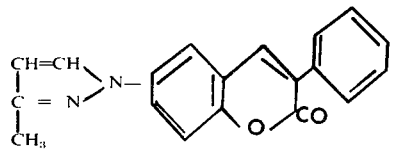  VII

If the concentration of the compounds of formula I, II and III present in the slurry is too high, the slurry may become dilatant, and this leads to difficulties in pumping the slurry. This dilatancy can be overcome by diluting the slurry with water or aqueous electrolyte. However, if the concentration is too low, poor settling stability is obtained.

The desired proportion of compounds having the formula I, II or III which is present in the slurry may be obtained either by adding water, aqueous electrolyte, slurry or further dry powder to the wet filter-cake. This may be added with the dispersing agent, or may be added before or after the addition of the dispersing agent. The proportion of the compounds of formula I, II and III which is present in the slurry is advantageously from 20% to 60%, but is preferably from 20% to 45% by weight based on the weight of slurry.

The slurry is then mixed with the dispersing agent until it is homogeneous. The mixing may be carried out for instance in a homogeniser.

The thixotropic slurries under static storage conditions set to a gel-like form, which can easily be mobilized by stirring. This reduces the viscosity so that it is possible to discharge the slurry by pumping or running out under gravity.

The dispersing agent may be anionic, cationic or non-ionic surface active agent. Examples of suitable dispersing agents are as follows:

The sodium salt of the condensation product of naphthalene sulphonic acid and formaldehyde.

The sodium salt of dibutyl naphthalene sulphonic acid.

The condensation produce of capryl wax and ethylene oxide.

A mixture of cyclohexanol and stearamide.

The sodium salt of a sulphonated oil.

Bis (2-hydroxyethyl)-tallow amine oxide.

Mono fatty or resin acid esters of polyethylene glycols.

Amphoteric N-coco-$\beta$-amino butyric acid.

A polymer of mixed propylene/ethylene oxides.

Organic crystalline water soluble wax or the semisodium salt.

Non-ionic long chain polyoxyethylene ether condensates.

The amount of dispersing agent that is added to the wet filter-cake is generally from 0.1% to 5% by weight based on the weight of the wet filter-cake, and preferably the proportion of dispersing agent is within the range of from 0.5% to 2% by weight based on the weight of the wet filter-cake.

If desired, a gelling agent may also be added to the slurry. Examples of gelling agents are carboxy vinyl polymers, highly beneficiated magnesium silicate, magnesium montmorillonite, pure silicic acid in fine particle form of fumed silica sold under the Trade Name Cab-o-sil M-5. The amount of gelling agent added may vary but is usually within the range of from 0.1% to 2% by weight based on the weight of wet filter-cake, preferable from 0.1% to 1%.

If desired an electrolyte may be added to the slurry. The electrolyte may be sodium chloride, sodium sulphate, sodium carbonate or the corresponding potassium salt. The amount of electrolyte may be from 4% to 25% by weight, based on the total weight of slurry, preferably from 5% to 20%.

Furthermore, the cold water dyeing properties may be improved by subjecting the slurry to a grinding treatment. The cold water dyeing properties depend on the surface area of the particles and the particle size can be controlled during the preparation of the compound or by grinding the slurry.

The viscosity of the slurry is linked to the concentration and the surface area of the particles. At 6 revolutions per minute the Brookfield viscosity is preferably from 2000 to 5000 centipoise and at 60 revolutions per minute the viscosity is preferably from 50 to 1000 centipoise.

If desired, a slurry of more than one compound of formula I, II or III or the three may be prepared either by mixing the wet filter-cake of more than one of these compounds with dispersing agent or by mixing the resultant slurries if desired in the presence of further electrolyte to prevent discolouration.

There is also provided a process in which a slurry is prepared, containing from 10% to 40% by weight of a compound of formula

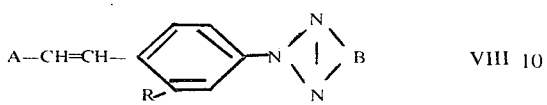

VIII wherein A represents an aromatic carbocyclic radical which contains at most two rings and may be substituted by halogen atoms, alkoxy groups, sulphonic acid groups or carboxyl groups, B represents a benzene or naphthalene radical in which two vicinal carbon atoms are bound to nitrogen atoms of the triazole ring and which may be substituted by halogen atoms or alkyl, an alkali metal sulphonic acid or carboxyl groups and R is an alkali metal sulphonic acid or cyanide radical or a hydrogen atom, by mixing the wet filter-cake obtained during the preparation of this compound with such quantity dispersing agent that the resultant slurry is thixotropic and, therefore, has reduced tendency to settle out on static storage and has a Brookfield viscosity at equilibrium from 2,000 to 10,000 centipoise at 6 revolutions per minute, 1,000 to 3,500 centipoise at 12 revolutions per minute and up to 2,000 centipoise at 60 revolutions per minute.

In the compound of formula VIII, the grouping A is preferably a benzene radical and R a sodium sulphonic acid radical. Apart from the different proportions present in the slurry of the compounds of formula VIII and those of formulae I, II and III (10% to 40% for compounds of formula VIII and 15% to 60% for compounds of formulae I, II and III) all the conditions are identical for compounds of formulae I to VIII.

The present invention provides also a process in which a slurry is prepared containing from 15% to 60% by weight based on the total weight of slurry of a compound of formula

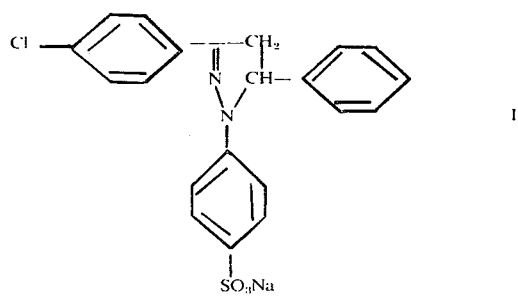

IX by mixing the wet filter-cake obtained during the preparation of this compound with from 0.1% to 6% by weight of electrolyte such that the resultant slurry is thixotropic and therefore has reduced tendency to settle out on static storage and has a Brookfield viscosity at equilibrium from 2,000 to 10,000 centipoise at 6 revolutions per minute, 1,000 to 3,500 centipoise at 12 revolutions per minute and up to 2,000 centipoise at 60 revolutions per minute.

The wet filter-cake may contain from 20% to 80% solids depending on the conditions but usually it contains from 35% to 55% solids.

If the concentration of the compound of formula IX present in the slurry is too high, the slurry may become dilatent and this leads to difficulties in pumping the slurry. This dilatancy can be overcome by diluting the slurry with water or aqueous electrolyte. However, if the concentration is too low, poor settling stability is obtained.

The desired proportion of the compound having the formula IX which is present in the slurry, may be obtained either by adding water, aqueous electrolyte, slurry or further dry powder to the wet filter-cake. The proportion of the compound of formula IX which is present in the slurry is advantageously from 20% to 60% but is preferably from 20% to 45% by weight based on the weight of the slurry.

The electrolyte is preferably added as an aqueous solution, a 5% to 10% solution being especially convenient. The electrolyte may be sodium chloride, sodium sulphate, sodium carbonate or the corresponding potassium salts. The amount of electrolyte present in the final slurry is preferably from 0.5% to 2% by weight based on the total weight of slurry. Advantageously, the slurry may afterwards be subjected to a grinding technique, such as Perl Milling.

The thixotropic slurries under static storage conditions set to a gel-like form, which can easily be mobilised by stirring. This reduces the viscosity so that it is possible to discharge the slurry by pumping or running out under gravity.

The viscosity of the slurry is linked to the concentration and the surface area of the particles. At 6 revolutions per minute the Brookfield viscosity is preferably from 2000 to 5000 centipoise and at 60 revolutions per minute the viscosity is preferably from 50 to 1,000 centipoise.

The homogeneous slurry thus produced, containing a compound of formulae I to IX, may, if desired, be diluted or concentrated according to requirements.

The production of an aqueous slurry according to the present invention has the advantage over the production of the dry powder in that the compound of formulae I to IX is produced in a form suitable for immediate use by a quicker process involving fewer stages and there is correspondingly less product lost during its preparation. Furthermore, the slurries of the present invention may be kept for several weeks, for instance 12 weeks or more without any appreciable settling during storage or deterioration of properties when incorporated in a detergent.

The slurry may afterwards be incorporated into a detergent, for instance by metering directly into a detergent slurry immediately prior to spray drying, the required amount of slurry from a tank into a mixer containing a slurry of the detergent. The amount of slurry added may be from 0.1% to 3.0% by weight based on the total weight of detergent.

The present invention also provides a detergent composition prepared by adding a slurry prepared as hereinbefore described to a detergent which may afterwards be mixed and dried. The following Example will now be given, all parts being by weight:

EXAMPLE 1

0.5 parts of the sodium salt of the condensation product of naphthalene sulphonic acid and formaldehyde and 0.7 part of magnesium silicate sold under the trade name "Benaqua" was added to a filter-cake comprising 74.7 parts water and 24.1 parts of a compound having the formula

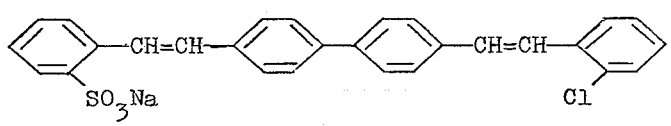

X

This was first hand mixed then homogenised in a Silverson mixer. The Brookfield viscosity range was 3,520 centipoise at 6 r.p.m. and less than 1,000 centipoise at 60 r.p.m. and no appreciable settling was observed over a 12 week period.

EXAMPLE 2

0.1 part of the sodium salt of the condensation product of naphthalene sulphonic acid and formaldehyde and 0.8 part magnesium silicate sold under the trade name "Benaqua", were added to a filter-cake comprising 75.6 parts water and 23.5 parts of compound having the formula VI. This was first hand mixed, then homogenised in a Silverson mixer. The Brookfield viscosity range of the slurry was 2850 centipoise at 6 r.p.m. and less than 1,000 centipoise at 60 r.p.m.

EXAMPLE 3

0.6 part of the sodium salt of the condensation product of naphthalene sulphonic acid and formaldehyde and 1.6 parts of magnesium silicate, sold under the trade name "Benaqua" were added to a filter-cake comprising 32.6 parts of a compound having formula VII and 65.2 parts water. This was first hand mixed then homogenised using a Silverson mixer. The Brookfield viscosity range of the slurry was 4,520 centipoise at 6 r.p.m. and less than 1,000 centipoise at 60 r.p.m. The slurry was stable over 12 weeks.

EXAMPLE 4

6.0 parts of the sodium salt of the condensation product of naphthalene sulphonic acid and formaldehyde was added to a wet filter-cake comprising 55.0 parts water and 45.0 parts of the compound having formula

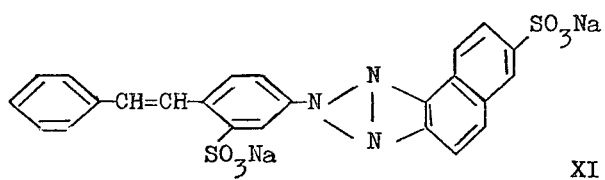

XI

This was diluted with 5% to 10% brine to produce a slurry containing 15.0 parts of the compound of formula XI, 77.0 parts water, 6.5 parts of sodium chloride and 1.5 parts of dispersing agent. This was hand mixed, then homogenised with a Silverson mixer. The Brookfield viscosity range of the slurry was 4,700 centipoise at 6 r.p.m. and below 1,000 centipoise at 60 r.p.m. and no appreciable settling was observed over a 12 weeks period.

EXAMPLE 5

0.75 part of the sodium salt of the concentration product of naphthalene sulphonic acid and formaldehyde and 0.95 part magnesium silicate, sold under the trade name "Benaqua", was added to a wet filter-cake comprising 60.4 parts of water and 37.9 parts of a compound of formula

XII

This was first hand mixed then homogenised in a Silverson mixer. The Brookfield viscosity range of the slurry was 3,100 centipoise at 6 r.p.m. and less than 1,000 centipoise at 60 r.p.m. and no appreciable settling was observed over a 12 week period.

EXAMPLE 6

A wet filter-cake containing 46.1 parts of compound of formula IX and 53.9 parts water was diluted with 20 parts of 5% sodium chloride solution to produce a slurry containing 38.5 parts of the compound of formula IX, 60.8 parts of water and 0.7 parts sodium chloride.

This was first hand mixed and then homogenised in a Silverson mixer and the resultant slurry had a Brookfield viscosity range of 2750 centipoise at 6 r.p.m. and less than 1,000 centipoise at 60 r.p.m. The slurry was reasonable stable over a 12 week period.

EXAMPLE 7

A wet filter-cake containing 49.8 parts of compound of formula IX and 50.2 parts water was diluted with 25 parts 5% sodium chloride solution to produce a slurry containing 39.4 parts of the compound of formula IX, 59.6 parts of water and 1.0 parts of sodium chloride. This was first hand mixed and then homogenised in a Silverson mixer. 500 parts of the slurry were then Perlmilled with 500 parts of Ballotine (3 millimetres diameter) for 30 minutes at 400 r.p.m. The viscosity of the slurry was 3,150 centipoise at 6 r.p.m. and less than 1,000 centipoise at 60 r.p.m. The slurry was stable over a 12 week period.

What is claimed is:

1. An aqueous process in which a thixotropic slurry is prepared containing from 15% to 60% by weight based on the total weight of slurry of a compound having the formula:

IV wherein $X_1$ is a sulphonic acid radical or its alkali metal salt, $X_2$ is hydrogen, a sulphonic acid radical or its alkali metal salt, halogen, alkyl with 1 to 4 carbon atoms or the carboxylic acid group or its alkali metal salt, $X_3$ is hydrogen, a sulphonic acid radical or its alkali metal salt, halogen, alkyl with 1 to 4 carbon atoms, alkoxy with 1 to 4 carbon atoms, a carboxylic acid group or its alkali metal salt, carbalkoxy with 2 to 5 carbon atoms or cyano and $X_4$ is hydrogen, a sulphonic acid radical or its alkali metal salt, halogen, alkyl with 1 to 4 carbon atoms or alkoxy with 1 to 4 carbon atoms, or a compound having the formula

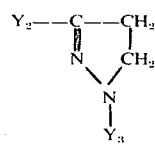
II wherein $Y_2$ is a substituted or unsubstituted phenyl radical and $Y_3$ is a phenyl radical substituted in the para position by an alkyl carboxylate group containing from 1–4 carbon atoms in the alkyl radical, or a cyano group, or a carbonamide group or a carbonamide group substituted by low alkyl groups, or an unsubstituted or substituted sulphonamide group or an alkylsulphonyl group or substituted in the meta position by fluorine, chlorine or bromine, or a compound having the formula

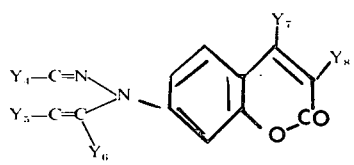
III wherein $Y_4$ is hydrogen, an alkyl radical having 1–5 carbon atoms or phenyl, $Y_5$ is hydrogen, chlorine or phenyl, $Y_6$ is hydrogen or a low alkyl radical, $Y_7$ is hydrogen and $Y_8$ is phenyl or phenyl substituted by methyl or chlorine, or is a sulphonic acid group, a sulphonamide group or a substituted sulphonamide group, by mixing the wet filter-cake obtained during the preparation of a said compound with 0.1% to 5.0% by weight based on the weight of the net filter-cake of an anionic, cationic or non-ionic surface-active agent so that the resultant slurry is thixotropic and therefore has reduced tendency to settle out on static storage and has a Brookfield viscosity at equilibrium from 2,000 to 10,000 centipoise at 6 revolutions per minute, 1,000 to 3,500 centipoise at 12 revolutions per minute and up to 2,000 centipoise at 60 revolutions per minute.

2. A process according to claim 1, in which is used a compound of formula IV.

3. A process according to claim 1, in which is used a compound of formula II or III.

4. A process according to claim 1, in which is used a compound of formula IV, wherein $X_1$ is the sulphonic acid radical or its sodium salt $X_2$ is hydrogen or chlorine, $X_3$ is the sulphonic acid radical or its sodium salt or chlorine and $X_4$ is hydrogen or chlorine.

5. A process according to claim 1, in which is used a compound of formula

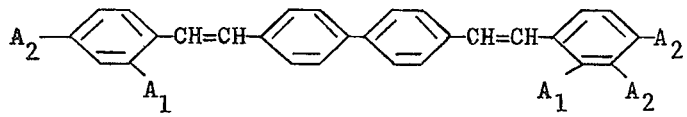
V wherein $A_1$ is an alkali metal sulphonic acid radical, a halogen atom or hydrogen and $A_2$ is a halogen or hydrogen atom.

6. A process according to claim 1, in which is used a compound of formula V, wherein the grouping $A_1$ is a sodium sulphonic acid radical or chlorine atom and its grouping $A_2$ is a hydrogen atom.

7. A process according to claim 1, in which is used the compound of formula

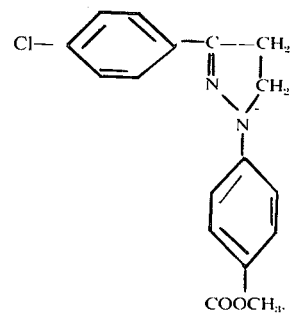
VI

8. A process according to claim 1, in which is used the compound of formula

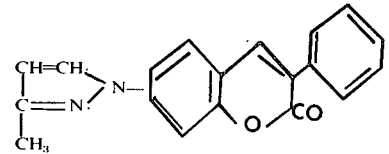
VII

9. A process according to claim 1, in which the proportion of the optical brightener present in the slurry is from 20% to 45% by weight based on the weight of the slurry.

10. A process according to claim 1 in which the surface active agent is the sodium salt of the condensation product of naphthalene sulphonic acid and formaldehyde.

11. A process according to claim 1 in which 0.1 to 2.0 by weight of the wet filter cake of a gelling agent is added to the slurry.

12. A process according to claim 11, in which the gelling agent is magnesium silicate.

13. A process according to claim 1 in which there is added to the slurry from 4% to 25% by weight based on the total weight of the slurry of the strong electrolyte of the group consisting of sodium chloride, sodium sulphate, sodium carbonate or the corresponding potassium salts.

14. A process according to claim 13, in which the electrolyte is sodium chloride.

15. A process according to claim 1, in which the slurry is subjected to a grinding treatment.

16. A process according to claim 1, in which the Brookfield viscosity is from 2,000 to 5,000 centipoise at 6 revolutions per minute and from 50 to 1000 centipoise at 60 revolutions per minute.

17. An aqueous process in which a slurry is prepared, containing from 10% to 40% by weight of a compound of formula

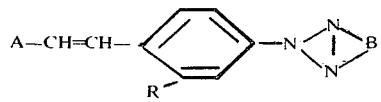

VIII wherein A represents an aromatic carbocyclic radical which contains at most two rings and may be substituted by halogen atoms, alkoxy groups, sulphonic acid groups or carboxy groups, B represents a benzene or naphthalene radical in which two vicinal carbon atoms are bound to nitrogen atoms of the triazole ring and which may be substituted by halogen atoms or alkyl, an alkali metal sulphonic acid or carboxyl groups and R is an alkali metal sulphonic acid or cyanide radical or a hydrogen atom, by mixing the wet filter-cake obtained during the preparation of this compound with 0.1% to 5.0% by weight based on the weight of the wet filter cake of an anionic, cationic or non-ionic surface active agent so that the resultant slurry is thixotropic and, therefore, has reduced tendency to settle out on static storage and has a Brookfield viscosity at equilibrium from 2,000 to 10,000 centipoise at 6 revolutions per minute, 1,000 to 3,500 centipoise at 12 revolutions per minute and up to 2,000 centipoise at 60 revolutions per minute.

18. A process according to claim 17, in which is used a compound of formula VIII, wherein A is a benzene radical and R a sodium sulphonic acid radical.

19. A process according to claim 17, in which the surface-active agent is the sodium salt of the condensation product of naphthalene sulphonic acid and formaldehyde.

20. A process according to claim 17, in which 0.1% to 2.0% by weight based on the weight of the wet filter cake of a gelling agent is added to the slurry.

21. A process according to claim 17, in which the gelling agent is magnesium silicate.

22. A process according to claim 17, in which there is added to the slurry from 4% to 25% by weight of a strong electrolyte based on the total weight of slurry of an electrolyte selected from the group consisting of sodium chloride, sodium sulphate, sodium carbonate or the corresponding potassium salts.

23. A process according to claim 17, in which the slurry is subjected to a grinding treatment.

24. A process according to claim 17, in which the Brookfield viscosity is from 2,000 to 5,000 centipoise at 6 revolutions per minute.

25. An aqueous process in which a slurry is prepared containing from 15% to 60% by weight based on the total weight of slurry of a compound having the formula

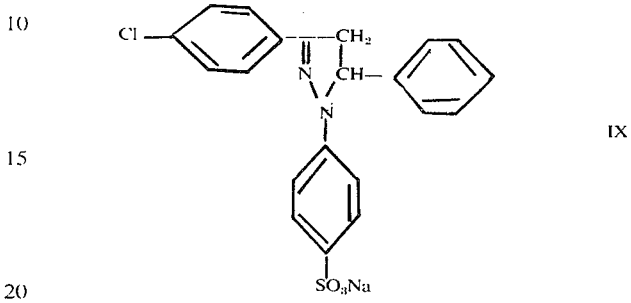

IX by mixing the wet filter-cake obtained during the preparation if this compound with from 0.1% to 6% by weight of electrolyte selected from the group consisting of sodium chloride, sodium sulphate, sodium carbonate or its corresponding potassium salts, such that the resultant slurry is thixotropic and therefore has reduced tendency to settle out on static storage and has a Brookfield viscosity at equilibrium from 2,000 to 10,000 centipoise at 6 revolutions per minute, 1,000 to 3,500 centipoise at 12 revolutions per minute and up to 2,000 centipoise at 60 revolutions per minute.

26. A process according to claim 25, in which the proportion of compound of formula IX present in the slurry is from 20% to 45% by weight based on the weight of the slurry.

27. A process according to claim 25, in which the electrolyte is added as an aqueous solution containing from 5% to 10% electrolyte.

28. A process according to claim 25, in which the electrolyte present in the final slurry is from 0.5% to 2% by weight based on the total weight of slurry.

29. A process according to claim 25, in which the slurry is subjected to a grinding treatment.

30. A process according to claim 25, in which the Brookfield viscosity is from 2000 to 5000 centipoise at 6 revolutions per minute and from 50 to 1000 centipoise at 60 revolutions per minute.

31. An aqueous thixotropic slurry containing (a) from 15% to 60% by weight based on the total weight of slurry of a compound having the formula:

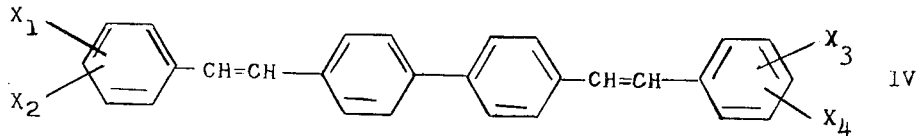

IV wherein $X_1$ is a sulphonic acid radical or its alkali metal salt, $X_2$ is hydrogen, a sulphonic acid radical or its alkali metal salt, halogen, alkyl with 1 to 4 carbon atoms or the carboxylic acid group or its alkali metal salt, $X_3$ is hydrogen, a sulphonic acid radical or its alkali metal salt, halogen, alkyl with 1 to 4 carbon atoms, alkoxy with 1 to 4 carbon atoms, a carboxylic acid group or its alkali metal salt, carbaloxy with 2 to 5 carbon atoms or cyano and $X_4$ is hydrogen, a sulphonic acid radical or its alkali metal salt, halogen, alkyl with 1 to 4 carbon atoms or alkoxy with 1 to 4 carbon atoms, or a compound having the formula

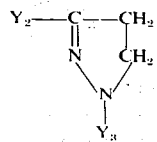

wherein $Y_2$ is a substituted or unsubstituted phenyl radical and $Y_3$ is a phenyl radical substituted in the para position by an alkyl carboxylate group containing from 1–4 carbon atoms in the alkyl radical, or a cyano group, or a carbonamide group or a carbonamide group substituted by low alkyl groups, or an unsubstituted or substituted sulphonamide group or an alkyl sulphonyl group or substituted in the meta position by fluorine, chlorine or bromine, or a compound having the formula

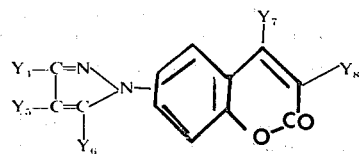

wherein $Y_4$ is hydrogen, an alkyl radical having 1–5 carbon atoms or phenyl, $Y_5$ is hydrogen, chlorine or phenyl, $Y_6$ is hydrogen or a low alkyl radical, $Y_7$ is hydrogen and $Y_8$ is phenyl or phenyl substituted by methyl or chlorine, or is a sulphonic acid group, a sulphonamide group or a substituted sulphonamide group, (b) a content of from 0.1%–5% by weight based on the total weight of the slurry of an anionic, cationic or non-ionic surface-active agent and (c) a Brookfield viscosity at equilibrium from 2,000 to 10,000 centipoise at 6 revolutions per minute, 1,000 to 3,500 centipoise at 12 revolutions per minute and up to 2,000 centipoise at 60 revolutions per minute.

32. A thixotropic slurry according to claim 31, characterized by a content of a compound having formula IV.

33. A thixotropic slurry according to claim 31, characterized by a content of a compound of formula II or III.

34. A thixotropic slurry according to claim 31, characterized by a content of a compound of formula wherein $X_1$ is a sulphonic acid radical or its alkali metal salt, $X_2$ is hydrogen, a sulphonic acid radical or its alkali metal salt, halogen, alkyl with 1 to 4 carbon atoms or the carboxylic acid group or its alkali metal salt, $X_3$ is hydrogen, a sulphonic acid radical or its alkali metal salt, halogen, alkyl with 1 to 4 carbon atoms, alkoxy with 1 to 4 carbon atoms, a carboxylic acid group or its alkali metal salt, carbalkoxy with 2 to 5 carbon atoms or cyano and $X_4$ is hydrogen, a sulphonic acid radical or its alkali metal salt, halogen, alkyl with 1 to 4 carbon atoms or alkoxy with 1 to 4 carbon atoms.

35. A thixotropic slurry according to claim 31, characterized by a content of a compound of formula IV, wherein $X_1$ is the sulphonic acid radical or its sodium salt, $X_2$ is hydrogen or chlorine, $X_3$ is the sulphonic acid radical or its sodium salt or chlorine and $X_4$ is hydrogen or chlorine.

36. A thixotropic slurry according to claim 31, characterised by a content of a compound having the formula:

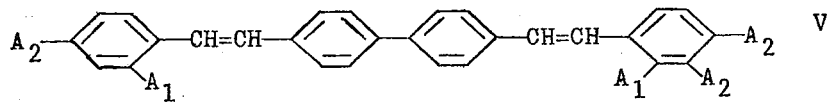

wherein $A_1$ is an alkali metal sulphonic acid radical, a halogen atom or hydrogen and $A_2$ is a halogen or hydrogen atom.

37. A thixotropic slurry according to claim 31, characterised by a content of a compound of the formula V, in which the grouping $A_1$ is a sodium sulphonic acid radical or chlorine atom and the grouping $A_2$ is a hydrogen atom.

38. A thixotropic slurry according to claim 31, characterised by the content of the compound of the formula

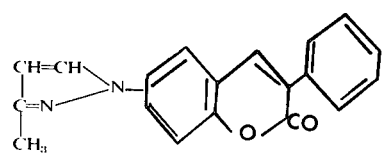

39. A thixotropic slurry according to claim 31, characterised by the content of the compound of formula

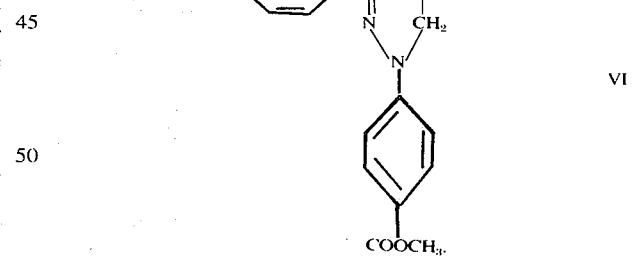

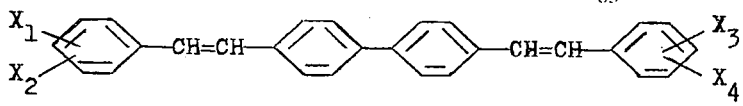

40. A thixotropic slurry according to claim 31, characterised by a content of from 20% to 45% by weight of an optical brightener based on the total weight of the slurry.

41. A thixotropic slurry according to claim 31, in which the surface-active agent is the sodium salt of the condensation product of naphthalene sulphonic acid and formaldehyde.

42. A thixotropic slurry according to claim 31, wherein the Brookfield viscosity is from 2000 to 5,000 centipoises at 6 r.p.m. and from 50 to 1,000 centipoises at 60 r.p.m.

43. A thixotropic slurry according to claim 31, characterised by a content of from 0.1% to 2.0% by weight based on the total weight of a gelling agent of the slurry.

44. A thixotropic slurry according to claim 43, wherein the gelling agent is magnesium silicate.

45. An aqueous thixotropic slurry, characterised by:
a. a content of from 10% to 40% by weight based on the total weight of the slurry of an optical brightener having the formula

   VIII wherein A represents an aromatic carbocyclic radical which contains at most two rings and may be substituted by halogen atoms, alkoxy groups, sulphonic acid groups or carboxyl groups, B represents a benzene or naphthalene radical in which two vicinal carbon atoms are bound to nitrogen atoms of the triazole ring and which may be substituted by halogen atoms or alkyl, an alkali metal sulphonic acid or carboxyl groups and R is an alkali metal sulphonic acid or cyanide radical or a hydrogen atom,
b. a content of from 0.1% – 5% by weight based on the total weight of the slurry of an anionic, cationic or non-ionic surface-active agent, and
c. a Brookfield viscosity from 2000 to 10,000 centipoise at 6 r.p.m. and up to 2,000 centipoise at 60 r.p.m.

46. A thixotropic slurry according to claim 45, characterised by:
a. a content of an optical brightener of the formula VIII, in which the grouping A is a benzene radical and R a sodium sulphonic acid radical.

47. A thixotropic slurry according to claim 46, in which the surface-active agent is the sodium salt of the condensation product of naphthalene sulphonic acid and formaldehyde.

48. A thixotropic slurry according to claim 45, wherein the Brookfield viscosity is from 2000 to 5,000 centipoise at 6 r.p.m.

49. A thixotropic slurry according to claim 45, characterised by a content of a gelling agent of from 0.1% to 2.0% by weight based on the weight of the wet filtercake.

50. A thixotropic slurry according to claim 45, wherein the gelling agent is magnesium silicate.

51. A thixotropic slurry according to claim 45, characterised by the content of 4% to 25% by weight of a strong electrolyte based on the total weight of the slurry.

52. An aqueous thixotropic slurry, characterised by:
a. a content of from 15% to 60% by weight based on the total weight of the slurry of the optical brightener having the formula

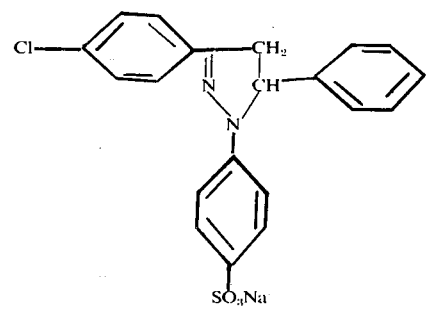   IX b. a content of from 0.1% to 6% by weight based on the total weight of the slurry of an electrolyte, and
c. a Brookfield viscosity from 2000 to 10,000 centipoise at 6 r.p.m. and up to 2,000 centipoise at 60 r.p.m.

53. A thixotropic slurry according to claim 52, characterised by a content of from 20% to 45% by weight based on the total weight of the slurry of the optical brightener.

54. A thixotropic slurry according to claim 52, in which the electrolyte is sodium chloride, sodium sulphate, sodium carbonate or the corresponding potassium salts.

55. A thixotropic slurry according to claim 52, wherein the Brookfield viscosity is from 2000 to 5,000 centipoise at 6 r.p.m. and from 50 to 1,000 centipoise at 60 r.p.m.

56. A thixotropic slurry according to claim 52, characterised by a content of the electrolyte of from 0.5% to 2.0% by weight based on the total weight of the slurry.

* * * * *

UNITED STATES PATENT AND TRADEMARK OFFICE
CERTIFICATE OF CORRECTION

PATENT NO. : 3,904,544
DATED : September 9, 1975
INVENTOR(S) : DAVID RONALD CLARK ET AL It is certified that error appears in the above-identified patent and that said Letters Patent are hereby corrected as shown below:

Column 9, claim 1, line 57, delete "net" and substitute --- wet ---.

Column 10, claim 13, line 67, delete "the" in the third occurrence and substitute --- a ---.

Column 11, claim 17, line 23, delete "carboxy" and substitute --- carboxyl ---.

Column 12, claim 25, line 10, amend the left side of the structural formula to read:

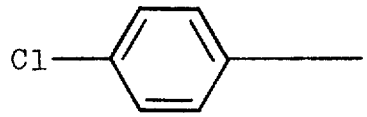

Column 15, claim 45, line 25, amend the right side of the structural formula to read:

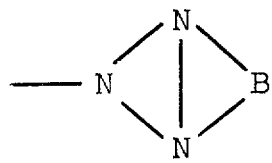

UNITED STATES PATENT AND TRADEMARK OFFICE
CERTIFICATE OF CORRECTION

PATENT NO. : 3,904,544
DATED : September 9, 1975
INVENTOR(S) : DAVID RONALD CLARK ET AL It is certified that error appears in the above-identified patent and that said Letters Patent are hereby corrected as shown below:

Column 16, claim 52, line 25, amend the right side of the structural formula to read:

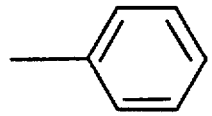

Signed and Sealed this thirteenth Day of April 1976

[SEAL]

Attest:

RUTH C. MASON
Attesting Officer

C. MARSHALL DANN
Commissioner of Patents and Trademarks